Sept. 14, 1954     A. L. KAESER     2,688,834
LAWN MOWER HANDLE AND MOUNTING

Filed Feb. 17, 1951

INVENTOR.
ARTHUR L. KAESER,
BY *Allen & Allen*

ATTORNEYS.

Patented Sept. 14, 1954

2,688,834

UNITED STATES PATENT OFFICE 2,688,834

LAWN MOWER HANDLE AND MOUNTING

Arthur L. Kaeser, Cincinnati, Ohio, assignor, by mesne assignments, to Weber Engineered Products, Inc., Cincinnati, Ohio, a corporation of Ohio Application February 17, 1951, Serial No. 211,489

4 Claims. (Cl. 56—25.4)

My invention relates to an adjustable handle primarily for use with a lawn mower or other type of apparatus which is operated over a surface on which the operator walks. Lawn mowers of either the power actuated type or the mechanically actuated type are usually controlled or pushed by means of a handle which is mounted on one or more shafts projecting upwardly at an angle from the body of the mower. Since the lawn mower is pushed or controlled for an appreciable length of time, the elevation of the controlling or operating handle is preferably adjustable so as to accommodate either a tall person or a short person, and in many cases a child. This adjustable feature is particularly advantageous wherein the handle and its mounting shafts are rigidly affixed to the lawn mower to permit rocking the mower during its operation and manipulating it over the ground.

It is an object of my invention to provide a lawn mower handle which is mounted on shafts which in turn are rigidly mounted on the mower during its operation, but which may be adjusted as to shaft angle in reference to the mower to raise and lower the handle at will.

It is a further object of my invention to provide a lawn mower handle which has the adjustable features set forth above and which is quite simple to adjust at will. A further object is to provide such a handle which may be easily removed from the mower for shipping, but which is rugged and sturdy when in position on the mower.

My lawn mower handle is relatively simple and inexpensive to construct and hence does not add appreciably to the manufacturing cost and sale price of a mower to which it is attached.

In the drawings and specifications which follow, I will show and described my adjustable handle in connection with a power driven rotary mower which is pushed across the surface. This is exemplary, however, and it is to be understood that my handle is equally adaptable for a hand propelled mower or any type of mower which requires pushing or controlling when in use. My handle may be used in the operation and control of other machines or devices which are moved or controlled across a surface where the operator must follow the device across the surface, or wherein it is desirable to adjust the height of the handle above the surface to accommodate operators of different statures. Preferably, my handle is supported by two parallel shafts since I have found that this provides a sturdier and firmer attachment to the mower and a better control over the mower. However, in certain cases, it may be desirable to provide a single shaft terminated by a handle and such a construction is within the contemplation of my invention.

These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawings which form a part thereof and in which.

Figure 1:
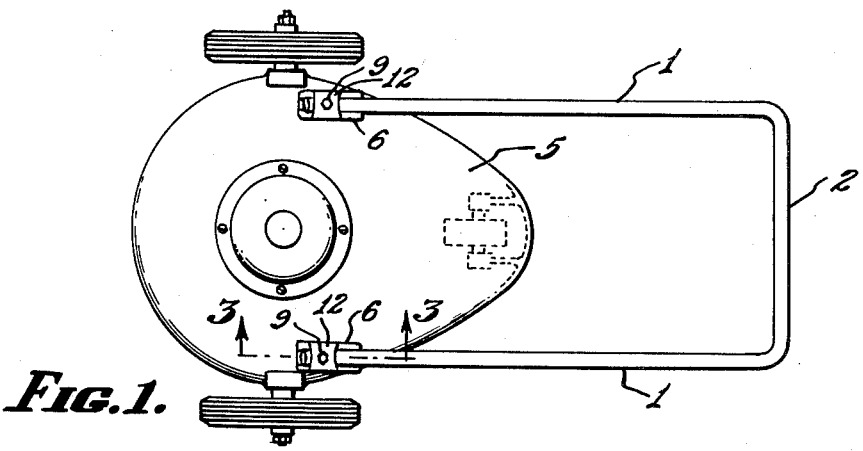
Figure 1 is a plan view of my adjustable handle mounted on a lawn mower.
Figure 3:
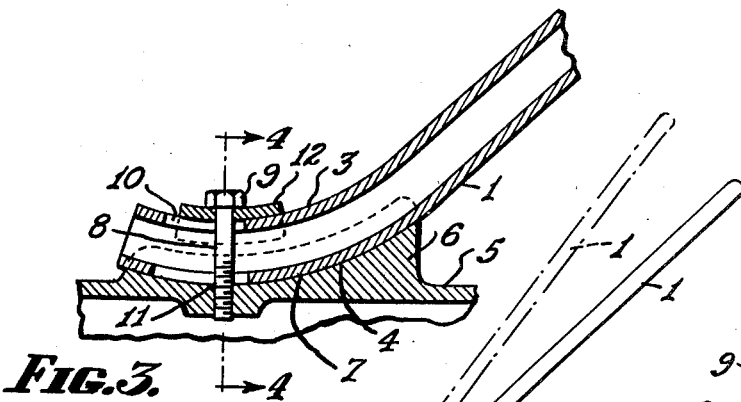
Figure 3 is an enlarged cross section of the joint between the shaft of my handle and the mower taken on the section line 3—3 of Figure 1.
Figure 4:
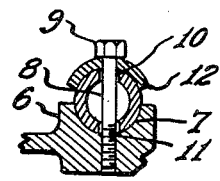
Figure 4 is a cross section of the joint and the clamping means taken on the section line 4—4 of Figure 3.
Figure 2:
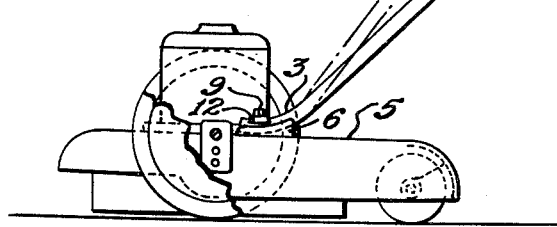
Figure 2 is a side elevation of the handle and mower shown in Figure 1.

Briefly, in the practice of my invention, I preferably provide a lawn mower handle mounted on the ends of parallel shafts having a circular transverse cross section. In the embodiment shown, the shafts and handle consist of a single pipe or tubing bent to form the parallel shafts which are joined by the integral handle portion. The free ends of the shafts are curved to a constant radius in a vertical plane when mounted on the mower. Mounted on the mower itself are seats to receive the curved ends of the shafts at all times in spite of peripheral, circumferential movement between the shaft ends and the surface of the seats. Since the main body of the shafts projects tangentially from the curved ends, this circumferential relative movement between the shaft ends and the seats decrease or increase the vertical angle of the body of the shafts and hence the elevation of the handle to the ground or surface on which the mower rests.

I provide clamps for holding the curved ends of the shafts in engagement with their seats, but permitting relative circumferential movement when the clamps are loosened. The preferred type of clamp which I have shown consists of a bolt projecting through a longitudinal slot in the shaft ends which has an appreciable length permitting the longitudinal movement of the shaft end in its seat without the complete removal of the bolt. In order to prevent the head of the bolt from cutting ino the surface of the shaft, I provide a saddle having a surface conforming to and in registry with the outer surface of the shaft end.

From the above, it is apparent that the bolts may be loosened and the curved portion of the shafts slid longitudinally in their seats, thus raising or lowering the handle height. When the shaft is in position to give the proper handle height, the bolts are tightened so that the shaft ends are firmly maintained in this position on their seats. When the mower is shipped or stored, the shafts may be easily removed by removing the bolts and lifting the shaft ends from their seats.

Referring to the drawings, the shafts 1 which carry the handle 2 terminate in curved portions 3 which have a longitudinally curved surface 4 of constant radius. Mounted on the body 5 of the mower are seats 6 which may be cast into the body of the mower or may be a separate fixture bolted or fastened to the mower in any normal manner.

The seats 6 have a concave surface 7 of the same constant radius as the curved portion 4 of the shaft 1 and having a curved transverse cross section so as to snugly receive the curve of the tubing from which the shafts are preferably made. In order to fasten the shaft end 3 to its registering seat 6, but to permit relative circumferential adjustment between the two, I provide a slot 10 in the shaft end 3 which receives a bolt 8 terminated by a head 9. The slot 10 is of sufficient length to permit the necessary movement by the seat 6 and the shaft end 3 for adjusting the handle height. The end of the bolt 8 is screwed into a socket 11 in the seat 6 and I preferably provide a saddle or yoke 12 which embraces the upper surface of the shaft end 3 and rests under the bolt head 9. With this construction, the handle may be adjusted by movement of the shaft end 3 in the seat 6 when the bolt 8 is loosened. After the handle has been correctly positioned, the bolt 8 is tightened and the head 9 then presses on the saddle 12, firmly clamping the shaft end 3 between the saddle 12 and the surface 7 of the seat 6.

In some instances the shafts 1 may be formed of other material than tubing and have a different transverse cross section than circular. In this case, the transverse cross section of the surface 7 of the seat 6 is made to conform to the periphery of the shaft end 3 with which it is in contact. However, the longitudinal curvature of the shaft end 3 has a constant radius and registers with the seat 6 during relative circumferential movement and such a construction is within the contemplation of my invention.

From the above, it is apparent that I have provided an adjustable lawn mower handle which is quite simple and inexpensive to construct. My lawn mower handle is simple to adjust as to height and easy to remove for shipping or storage, but which is sturdy and positive when once adjustment has been made and maintained by my clamp.

It is to be understood that modification may be made in my invention without departing from the spirit thereof, and I do not intend to limit myself otherwise than as pointed out in the claims which follow. Having thus described my invention, what I claim as new and desire to secure by Letters Patent is:

1. An adjustable handle and fastening means for a lawn mower comprising a single tubular shaft of constant external radius bent to form a pair of parallel shafts spaced apart by a handle portion, the free ends of said shafts being formed into a curve of constant radius, seats receiving said curved portions mounted on the lawn mower and each having a longitudinal curvature of the same constant radius as the curvature of said shaft ends, and the transverse curvature of the same radius as the tubular shaft, and fastening means for said shaft ends comprising bolts passing through slots in said curved ends and screwed into said seats, said bolts having heads which rest on saddles conforming to the periphery of said shaft ends, so that the same are tightly embraced between the saddles and the seats at different relative positions of the handle.

2. An adjustable handle and fastening means for a lawn mower comprising a single tubular shaft of constant external radius bent to form a pair of parallel shafts spaced apart by a handle portion, the free ends of said shafts being formed into a curve of constant radius, seats receiving said curved portions mounted on the lawn mower and each having a longitudinal curvature of the same constant radius as the curvature of said shaft end and the transverse curvature of the same radius as the tubular shaft, and fastening means for said shaft ends comprising saddles conforming to the periphery of said shaft ends and mounted thereon diametrically opposite said seats, and means urging said saddles and seats together so they tightly embrace said shaft ends in different relative positions of the same.

3. Adjustable fastening means for a tubular lawn mower handle shaft comprising the provision of a curve of constant radius in the free end of the shaft, a seat receiving said curved portion mounted on a lawn mower and having a longitudinal curvature of the same constant radius as the curvature of said shaft end and a transverse curvature of the same radius as the tubular shaft, and fastening means for said shaft end comprising a bolt passing through a slot in said curved end and screwed into said seat, said bolt having a head which rests on a saddle conforming to the periphery of said shaft end, so that the same is tightly embraced between the saddle and the seat at different relative positions of the handle shaft.

4. Adjustable fastening means for a tubular lawn mower handle shaft comprising the provision of a curve of constant radius in the free end of the shaft, a seat receiving said curved portion mounted on a lawn mower and having a longitudinal curvature of the same constant radius as the curvature of said shaft end and a transverse curvature of the same radius as the tubular shaft, and fastening means for said shaft end comprising a saddle conforming to the periphery of said shaft end and mounted thereon diametrically opposite said seat, and means urging said saddle and seat together so they tightly embrace said shaft end in different relative positions of the same.

References Cited in the file of this patent

UNITED STATES PATENTS

| Number | Name | Date |
| --- | --- | --- |
| 407,340 | Faries | July 23, 1889 |
| 797,840 | Choate | Aug. 22, 1905 |
| 1,132,658 | Harrison | Mar. 23, 1915 |
| 1,338,781 | Levy | May 4, 1920 |
| 2,252,126 | Kersey | Aug. 12, 1941 |
| 2,259,676 | Winchell | Oct. 21, 1941 |
| 2,265,545 | Phelps | Dec. 9, 1941 |
| 2,476,036 | George et al. | July 12, 1949 |
| 2,505,377 | Barker et al. | Apr. 25, 1950 |